United States Patent [19]

Masaoka et al.

[11] Patent Number: 4,672,080
[45] Date of Patent: Jun. 9, 1987

[54] PHOTOCURABLE RESIN COMPOSITION PREPARED FROM URETHANE ACRYLATE OLIGOMER CONTAINING BISPHENOLS

[75] Inventors: Yoshiji Masaoka; Motonobu Kobo, both of Iwakuni, Japan

[73] Assignee: Sanyo-Kokusaku Pulp Co., Ltd., Tokyo, Japan

[21] Appl. No.: 775,331

[22] Filed: Sep. 12, 1985

[30] Foreign Application Priority Data

Feb. 4, 1985 [JP] Japan .................. 60-19752

[51] Int. Cl.$^4$ .................. C08F 2/50; C08F 20/20; C08F 28/02; C08F 228/02
[52] U.S. Cl. .................. 522/46; 522/96; 522/97; 525/920; 526/288
[58] Field of Search .................. 526/288; 522/96, 46, 522/97

[56] References Cited

U.S. PATENT DOCUMENTS

| | | | |
|---|---|---|---|
| 3,425,988 | 2/1969 | Gorman | 528/50 |
| 4,287,255 | 9/1981 | Wong | 522/95 |
| 4,458,007 | 7/1984 | Geissler | 522/95 |
| 4,480,079 | 10/1984 | Orton | 526/301 |

FOREIGN PATENT DOCUMENTS 1360237 7/1974 United Kingdom .

Primary Examiner—Lewis T. Jacobs
Assistant Examiner—Arthur H. Koeckert
Attorney, Agent, or Firm—Oblon, Fisher, Spivak, McClelland & Maier

[57] ABSTRACT

A photo-curable resin composition containing urethane oligomer compounds represented by a following general formula (I)

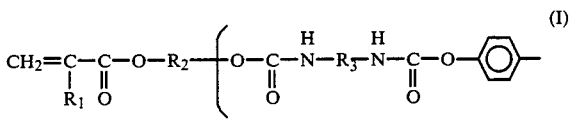

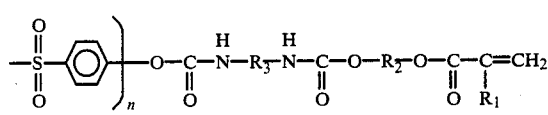

[wherein $R_1$ indicates —H or —CH$_3$. $R_2$ indicates an alkylene group with or without side chain having 1 to 6 carbon atoms or —(—CH$_2$CH$_2$—O—)$_m$—CH$_2$CH$_2$—, m=1—5. $R_3$ indicates a substituent selected from a group comprising

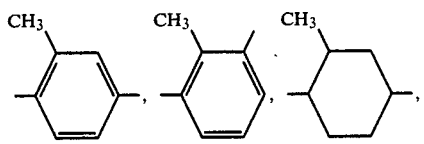

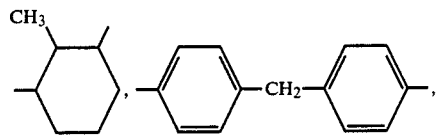

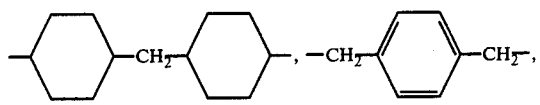

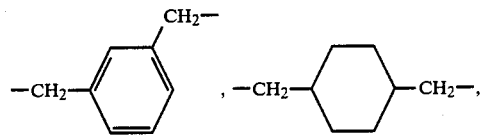

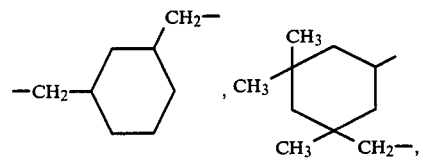

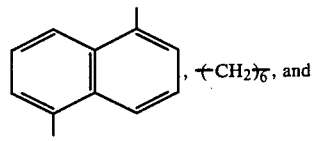

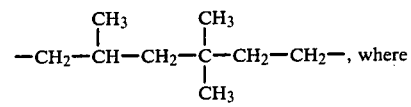

n is a number selected from integers 1 to 10 so as the molecular weight of compound to be not more than 5000] as a part or the whole of base resin.

1 Claim, No Drawings

PHOTOCURABLE RESIN COMPOSITION PREPARED FROM URETHANE ACRYLATE OLIGOMER CONTAINING BISPHENOLS

DETAILED DESCRIPTION OF THE INVENTION

The present invention relates to a photo-curable resin composition, in addition to being used for the paints, inks, adhesives, fixation of yeast, dentist's plugging material, etc., being useful for the printing block material, photo-resist, resist ink for printed circuit, etc. by utilizing the property thereof curable by light.

The photo-curable resins are those changeable from liquid state to solid through photo-irradiation and are constituted usually by reactive oligomer, reactive diluent and photoinitiator. It is an acrylic oligomer that is the mainstream of this reactive oligomer.

As the acrylic oligomer, there can be used a polyester acrylate, an epoxy acrylate, or a urethane acrylate type, for example. The oligomer suited for the desired function and the use is employed appropriately.

Among these, urethane acrylate is promising inasmuch as it has good air-hardening property, and it forms tough films and has good adherence to iron and glass, as described in Japanese Patent Publication Nos. 41708/1973 and 8013/1980.

As described above, when urethane oligomers are produced, various molecular designs are possible because of the reactivity of isocyanate and various possibilities are kept to themselves. A few kinds of urethane oligomers are on the market. However, a need exists for photo-curable resins which contain urethane oligomers having greater hardness and better adherence to the surface of iron as compared to the conventional oligomers.

In view of the above, and after diligent investigation, the present inventors have found that the photo-curable resins containing urethane oligomer compounds represented by general formula (I)

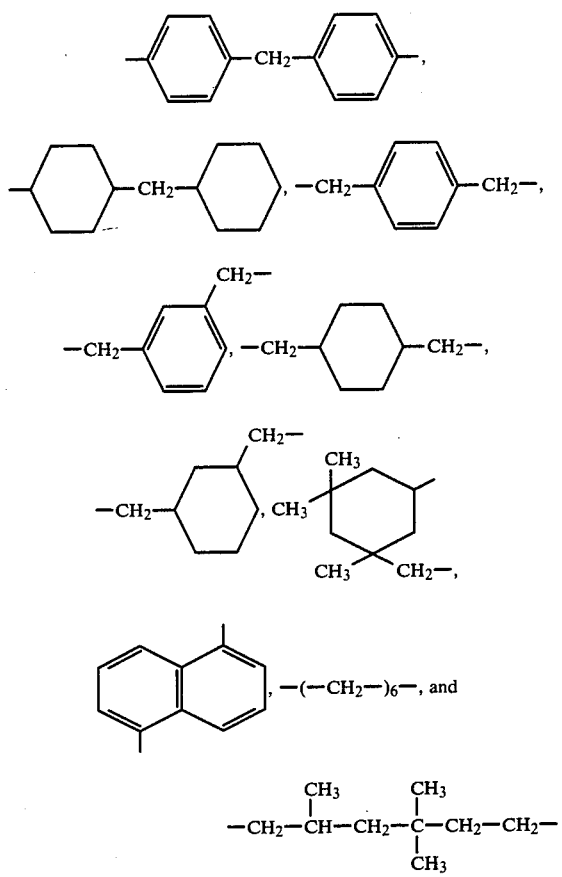

wherein $R_1$ indicates —H or —CH$_3$, $R_2$ indicates an alkylene group with or without side chain having 1 to 6 carbon atoms or —(—CH$_2$CH$_2$—O—)$_m$—CH$_2$CH$_2$—, m=1–5, $R_3$ indicates a substituent selected from a group comprising

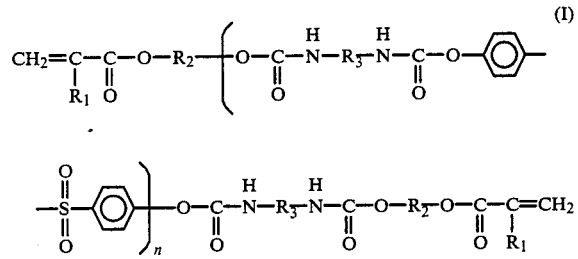

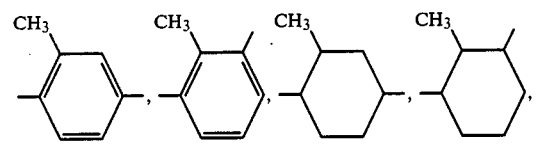

and n is a number selected from integers 1 to 10 so as the molecular weight of compound to be not more than 5000 as a part or the whole of the base resin in the photo-curable resin compositions having a base resin, reactive diluent and photoinitiator as major ingredients can form the hardened products which have excellent hardness and superior adherence to the surface of iron. This constitutes the present invention.

Besides, the above-mentioned urethane oligomer compounds used in the invention are novel substances developed by the inventors. Recognizing the usefulness thereof, the investigation and the research behind the present invention entailed the application of urethane oligomer compounds to photo-curable resin compositions. As a result, the invention has been completed based on such research.

In the present invention, the reactive diluent may be one having a polymerizable ethylenic unsaturated group. For example, trimethylolpropane tri(meth)acrylate, 1,6-hexaneglycol di(meth) acrylate, tetrahydrofurfuryl (meth)acrylate, styrene, methyl (meth)acrylate, etc. and mixtures thereof can be mentioned.

According to the present invention, a photo-polymerization can be present initiated using photoinitiator selected arbitrarily from known initiators of the type generating radicals through the irradiation of light such as benzophenone, acetophenone, benzil, O-benzoylbenzoic acid, methyl O-benzoylbenzoate, etc.

The compositions of the present invention can be varied widely depending on the intended use. However, a ratio of urethane oligomer compound: reactive diluent of 10:1 to 10:10 is usually preferable. Moreover, the photoinitiator is used in the amount of 0.01 to 10 parts, preferably 0.5 to 4 parts per 100 parts of resin comprising oligomer and diluent.

The photo-curable resins of the invention thus obtained are subjected to photo-irradiation with a xenon lamp, bactericidal lamp, or low voltage to extra high voltage mercury lamp, etc. to obtain the cured films.

In the following Examples, the details of the invention will be illustrated more concretely using examples and comparative examples. However, the present invention is not limited by these examples.

EXAMPLE 1

In a 1 l four-neck flask fitted with a thermometer, cooling pipe and stirrer were placed 174 g (1.0 mol) of tolylenediisocyanate (TDI), 125 g (0.5 mol) of bisphenol S and 500 ml of tetrahydrofuran (THF). Then, 0.2 g of dibutyl tin dilaurate were added to this and the reaction mixture was heated. Keeping the temperature near 50° C., the reaction was allowed to proceed for 3 hours. To this solution was added further 116 g (1.0 mol) of 2-hydroxyethyl acrylate and 0.02 g of hydroquinone monomethyl ether (MEHQ), and the reaction was conducted for 10 hours at 50° C.

When removing THF from this solution by vacuum drying, a powdery substance was obtained. The softening point was 55° to 56° C.

EXAMPLE 2

Example 1 was repeated except that tolylenediisocyanate was replaced with isophoronediisocyanate to obtain a powdery pale yellow substance. The softening point was 50° to 51° C.

Comparative Example 1

In a 1 l four-neck flask fitted with a thermometer, cooling pipe and stirrer were placed 174 g (1 mol) of tolunediisocyanate and 200 g (0.5 mol) of polyethylene glycol #400. Then, 0.2 g of dibutyl tin dilaurate were added to this and heated. Keeping the temperature near 50° C., the reaction was allowed to proceed for 3 hours.

To the reaction liquor was added further 116 g (1.0 mol) of 2-hydroxyethyl acrylate and 0.02 g of hydroquinone monomethyl ether (MEHQ), and the reaction was allowed to proceed for 10 hours at 50° C.

Comparative Example 2

Comparative Example 1 was repeated except that tolylenediisocyanate was replaced with isophoronediisocyanate to obtain the urethane oligomer.

Employing the urethane oligomer compounds obtained in Examples 1 and 2 and Comparative Examples 1 and 2, photo-curable resins were produced using the formulation listed in Table-1.

TABLE 1

|  | Parts by wt. |
|---|---|
| Urethane oligomer | 50 |
| Trimethylolpropane triacrylate | 20 |
| Tetrahydrofurfuryl acrylate | 24 |
| Methyl O—benzoylbenzoate | 6 |

Resins obtained using the formulation in Table 1 were coated on steel plates and exposed to light from a height of 10 cm stopping for 10 seconds just under the high voltage mercury lamp with an output of 120 W/cm to obtain films of coating. Test results of the physical properties of films obtained are shown in Table-2.

TABLE 2

| Sample | Example | | Comparative example | |
|---|---|---|---|---|
|  | 1 | 2 | 1 | 2 |
| Pencil hardness test JIS K5400 | 7H | 6H | 1H | 2H |
| Adherence test (Cross-cut method*) JIS K 5400 | 100/100 | 100/100 | 60/100 | 50/100 |

From these results, it can be readily seen that the compositions of the present invention have surprisingly superior film hardness and superior adherence to the surface of iron compared to comparative compositions.

What is claimed is:

1. A photo-curable resin composition consisting of a urethane oligomer, a reactive diluent of trimethylolpropane triacrylate or tetrahydrofurfuryl acrylate or a mixture thereof and a photoinitiator of methyl o-benzoyl-benzoate, wherein said urethane oligomer is obtained by reacting tolylenediisocyanate or isophoronediisocyanate or a mixture thereof, bisphenol S and 2-hydroxyethylacrylate, wherein the weight ratio of urethane oligomer to reactive diluent is about 1:1.

* * * * *